United States Patent [19]

Rackley

[11] 3,962,502

[45] June 8, 1976

[54] PROCESS FOR CURING HEAT-CURABLE COATING

[75] Inventor: Robert Lee Rackley, Newark, Del.

[73] Assignee: E. I. Du Pont de Nemours and Company, Wilmington, Del.

[22] Filed: Dec. 12, 1974

[21] Appl. No.: 532,240

[52] U.S. Cl. .............................. 427/444; 427/177; 427/179; 427/378; 427/385; 427/277
[51] Int. Cl.² ........................................... B44D 1/46
[58] Field of Search .......... 427/277, 177, 179, 300, 427/378, 385, 444; 432/5, 6; 156/288, 289, 323; 34/6, 24, 94

[56] References Cited
UNITED STATES PATENTS

| | | | |
|---|---|---|---|
| 753,904 | 3/1904 | McFarland | 34/94 X |
| 1,530,873 | 3/1925 | Williams | 34/94 |
| 1,941,362 | 12/1933 | Newcomb | 34/94 |
| 2,426,775 | 9/1947 | Lang | 156/338 X |
| 3,524,778 | 8/1970 | Jensch et al. | 156/106 X |

*Primary Examiner*—Ralph S. Kendall

[57] ABSTRACT

A process for curing a heat curable coating on a substrate is provided which is characterized by contacting one or both surfaces of the coated substrate with a patterned polyolefin film having a pattern height of at least 4 microns, followed by superposing the substrate and the patterned polyolefin film in alternating layers so as to provide an interleaf consisting of said patterned polyolefin film between adjacent layers of said substrate, and thereafter heating the superposed substrate and patterned polyolefin film at a temperature between about 25°C. and the softening temperature of said patterned polyolefin film.

5 Claims, No Drawings

PROCESS FOR CURING HEAT-CURABLE COATING

FIELD OF THE INVENTION

The present invention relates to a method for curing a heat-curable composition. More particularly, the invention is directed to a method for curing a heat-curable coating composition on one or both surfaces of a substrate.

BACKGROUND OF THE INVENTION

Substrates such as self-supporting film structures of organic thermoplastic polymeric material are often coated on one or both planar surfaces with a heat-curable composition. Heretofore, such coatings have been cured by passing the coated film structure through a heated chamber, and such processes usually require festooning the coated film structure in the heated chamber in order to provide adequate hold-up time in a chamber of reasonable size whereby to achieve economical operation. Various attempts have been made to provide better and improved processes for curing heat-curable coatings on substrate materials. An improved process is disclosed in U.S. Pat. No. 2,426,775 which describes passing a web consisting of a single sheet of fabric coated on one side with a heat-curable coating or consisting of two sheets of fabric and an interlayer therebetween of un-cured rubber composition into a heated chamber, and rapidly heating the web to a predetermined temperature followed by winding the heated web into roll form, and thereafter storing the rolled web at constant elevated temperature until the curing reaction is completed afterwhich the web is unrolled and cooled as by passing the web over cold idler rolls. A separator sheet such as "Holland" cloth is wound between the adjacent layers of the rolls to prevent the layers from sticking together. Also, the use of an interleaf between layers of a roll of organic thermoplastic film material is a well known expedient for preventing the layers of the roll from sticking together. For instance, U.S. Pat. Nos. 2,303,826; 2,303,828 and 3,524,778 each discloses the use of an interleaf for preventing the layers of a roll of polyvinyl acetal resin from sticking together. The interleaf may be of diverse materials such as a cellulose plastic, e.g., cellophane, polyethylene or a fibrous material, e.g., kraft paper, coated with cellulose acetate. The use of roll curing methods for curing heat-curable coatings on film structures having a high modulus, e.g., polyester films, with the use of interleaves having a smooth surface or without any interleaf is characterized by several drawbacks or major disadvantages, namely, flat spots, splitting, blocking and wrinkling of the film structure. Flat spots are surface irregularities on a film structure that contribute to poor optical appearance and are caused by air pockets entrapped in a roll during the winding sequence or pockets of entrapped gases that are evolved from a coating during the curing thereof. These air or gas pockets result in the non-uniform treatment of the rolled film structure when heated. Splitting of a roll film structure is caused by the accumulation of stress in the roll layers due to the winding tension employed and ordinarily occurs when the roll of film is heated. Blocking is a surface phenomenon characterized by intimate contact between adjacent layers of a roll of such an extensive nature as to render parting of the layers extremely difficult; blocking is analogous to sticking in that the latter is an extreme form of the former. Wrinkling is caused by non-uniform stresses that occur in the layers of a roll upon heating. Accordingly, the principal object of the present invention is to provide a method for curing a heat-curable coating on one or both surfaces of a flexible substrate that overcomes the foregoing drawbacks.

THE INVENTION

According to the present invention, there is provided a process for curing a heat-curable coating on at least one surface of a substrate which comprises contacting the coated surface of said substrate with a polyolefin film having a patterned surface characterized by a pattern height of at least 4 microns; superposing said substrate and said polyolefin film in alternating layers whereby said polyolefin film provides an interleaf between adjacent layers of said substrate; and heating said superposed substrate and polyolefin film to a temperature between about 25°C. and the softening temperature of said polyolefin film thereby to cure said coating on said substrate.

DETAILED DESCRIPTION

The nature and advantages of the present invention will be more clearly understood from the following more detailed description thereof.

The present invention provides a process for curing a heat-curable coating on a flexible substrate. The heat-curable coatings are those which are applied by any suitable means such as dipping and spraying to the flexible substrate material in un-cured form and thereafter are heated to effect curing thereof. Suitable heat-curable coatings include, for example, the abrasion resistant coating such as Abcite® which is a composition of a fluorocarbon-containing copolymer and a cross-linking agent such as, for example, polysilicic acid. Suitable coatings which may be subjected to the curing process of the present invention include such coatings as are described more fully in U.S. Pat. Nos. 3,819,562; 3,546,318; 3,514,425; 3,390,203; 3,429,845; 3,429,846 and 3,476,827.

The substrate may be any suitable material which, preferably, is flexible and capable of being wound into roll form, and include, for example, pellicles or film structures of organic thermoplastic material such as those of polyester, polyolefin, polyamide, polyurethane, and polyacetal resins. A preferred substrate is a film structure of polyethylene terephthalate. The substrate may be of any convenient thickness; for example, the preferred polyethylene terephthalate film may have a thickness up to about 100 mils.

In practicing the process of the invention, a substrate which has been coated on one or both of its flat planar surfaces is first contacted with a polyolefin film having a patterned surface. Suitable polyolefin films include those of polyethylene and polypropylene. The salient feature of the present invention is that the polyolefin film has a patterned surface characterized by a pattern height of at least 4 microns. The term "pattern" as employed herein is intended to mean a design of any suitable outline having a raised form on at least one surface of the polyolefin film. The pattern may be ordered or random in nature, and suitable patterns include, for example, a square, rectangular or diamond design of convenient size or dimension such as 10 design units per lineal inch. An example of a random pattern is a dimpled surface, i.e., raised protuberances, which may be of uniform or different size and spaced unevenly on the surface of the polyolefin film.

An essential feature of the invention is that the pattern on the polyolefin film must have a pattern height of at least about 4 microns. The foregoing is necessary in order to provide pathways or "channels" when the flexible substrate and the patterned polyolefin film are superposed as by winding for allowing air or gaseous materials from the coating to escape and be released from the rolled material during the curing treatment of the coated roll. The pattern should extend across the entire width of the polyolefin film, and the patterned polyolefin film should contact the flexible substrate across its entire width. Preferably, the patterned polyolefin film has a pattern height in the range between about 1 mil and about 4 mils. The thickness of the patterned polyolefin film may range between about 0.25 mil and about 2 mils; preferably, the polyolefin film is 1 mil thick.

The substrate and patterned polyolefin film are next superposed in alternating layers to provide a stack or a roll thereof. A roll is obtained by winding together a flexible substrate and the patterned polyethylene film. The patterned polyolefin film functions as an interleaf between adjacent layers of the flexible substrate. It is therefore necessary that the patterned polyolefin film not contain any additives or coatings that are incompatible with the coating on the substrate.

When the coated substrate and the patterned polyolefin film are superposed in roll form, the minimum pattern height of the patterned polyolefin film may be determined from the following equation:

$$PH = Fr/WtE$$

wherein
 $PH$ = pattern height, in.
 $F$ = winding force, lb.
 $r$ = radius of roll, in.
 $W$ = width of patterned polyolefin film, in.
 $t$ = thickness of patterned polyolefin film, in.
 $E$ = elastic modulus of patterned polyolefin film, lb./in.$^2$.

For instance, if $r$ is 4 inches, $t$ is 0.004 inch, $E$ is 500,000 psi, and $F/W$ is 0.1 lb./in., then the minimum pattern height (PH) calculated by the above equation is 0.0002 in. As a practical matter the pattern height should be at least 1 mil.

The superposed substrate and patterned polyolefin film are then heated to cure the coating on the substrate. The temperature at which the superposed substrate and patterned polyolefin film are heated is that which is sufficient to cure the heat-curable coating on the substrate. Ordinarily, this will be at a temperature above room temperature (i.e., above about 25°C.) but below the softening temperature of the patterned polyolefin film. For example, when using a patterned polyethylene film, the curing temperature should not exceed about 120°C., and when using a patterned polypropylene film, the curing temperature should not exceed about 140°C.

Use of the present invention overcomes the flat spot, splitting, blocking and wrinkling defects described hereinabove. For instance, flat spots are substantially eliminated because the channels provided by the patterned polyolefin film allow escape of air or gases which otherwise would be entrapped between successive layers of the flexible substrate. Splitting is substantially eliminated because the patterned polyolefin film absorbs a large measure of the roll stress resulting from winding tension.

The principle and practice of the present invention will now be illustrated by the following Examples which are exemplary only and it is not intended that the invention be limited thereto since modifications in technique and operation will be apparent to anyone skilled in the art.

EXAMPLE 1

A flexible substrate consisting of a polyethylene terephthalate film of 5 mils thickness was coated on one side with a 4 microns thick coating of Abcite®. The coated polyethylene terephthalate film was wound into a roll containing segments that had been interleaved by hand with a patterned polyethylene film having a thickness of 1 mil and a pattern height of 4 mils. The roll was heated in an oven at a temperature of 110°C. for 168 hours and thereafter allowed to cool to room temperature. Upon inspecting the roll it was observed that the noninterleaved portions exhibited flat spots and blocking. The interleaved portions of the roll were free of these defects.

EXAMPLE 2

A flexible substrate consisting of polyethylene terephthalate film having a thickness of 10 mils and a width of 40 inches was coated on one side with a 4 microns thick coating of Abcite®. The coated polyethylene terephthalate film was wound into separate rolls using a winding force of 22 lbs., 50 lbs. and 100 lbs. Each roll was interleaved throughout with the interleaf of Example 1. The rolls were heated in an oven at a temperature of 110°C. to cure the Abcite® coating. The rolls were inspected frequently and exhibited no defects even after 1 week at the 110°C. curing temperature.

EXAMPLE 3

Stacks consisting of alternating layers of 12 inch square polyethylene terephthalate film specimens having a thickness of 5 mils and coated with a 4 microns thick coating of Abcite® and 12 inch square patterned polyethylene film having a thickness of 1 mil and a pattern height of 3 mils were placed between 12 inch square glass lites in an oven maintained at a temperature of 110°C. Several control stacks of the coated polyethylene terephthalate film without any interleaf between the layers of the coated polyethylene terephthalate thereof also were placed in the same oven. Different weights of 5, 10 and 25 lbs. were placed on top of each stack.

Upon inspection it was observed that the coated polyethylene terephthalate film samples from the stacks containing the patterned polyethylene interleaf did not exhibit flat spots. The coated polyethylene terephthalate film samples from the stacks containing no interleaf exhibited flat spots.

EXAMPLE 4

The procedure of Example 3 was repeated except that an interleaf consisting of a patterned polypropylene film having a thickness of 1 mil and a pattern height of 3 mils was utilized in place of the patterned polyethylene film. Curing temperatures of 120° and 135°C. were used in this instance. The same results as Example 3 were observed.

EXAMPLE 5

A flexible substrate consisting of polyethylene terephthalate having a thickness of 10 mils and a width of 40 inches and coated on one surface with a 4 microns thick coating of Abcite® was passed through a set of calendering rolls (wherein the hot roll was maintained at 110°C.) and laminated on the uncoated side thereof to a sheet of polyvinyl butyral having a thickness of 15 mils and a width of 40 inches. The resulting flexible substrate of laminar construction was wound into a roll at a winding tension of 27 lbs. with an interleaf of patterned polyethylene film having a thickness of 1 mil and a pattern height of 3 mils. The resulting roll was placed in an oven maintained at 110°C. and after 7 days was removed from the oven and allowed to cool. The patterned polyethylene interleaf was easily removed from the roll. Upon inspection it was observed that the Abcite® coating of the laminated flexible substrate was completely cured and that the exposed polyvinyl butyral surface of the laminated flexible substrate was embossed with the surface pattern of the patterned polyethylene film interleaf.

What is claimed is:

1. A process for curing a heat-curable coating on at least one surface of a substrate which comprises contacting the coated surface of said substrate with a polyolefin film having an embossed patterned surface characterized by a pattern height of at least 4 microns and a width at least coextensive with said substrate; superposing said substrate and said polyolefin film in alternating layers whereby said polyolefin film provides an interleaf between adjacent layers of said substrate; and heating said superposed substrate and polyolefin film to a temperature between about room temperature and below the softening temperature of said polyolefin film thereby to cure said coating on said substrate and allow air or vapors from said coating to flow through pathways provided between said embossed polyolefin film and said substrate.

2. The process of claim 1 wherein said polyolefin film is polyethylene.

3. The process of claim 2 wherein said superposed substrate and polyethylene film are heated to a temperature between about 25°C. and about 120°C.

4. The process of claim 1 wherein said polyolefin film is polypropylene.

5. The process of claim 4 wherein said superposed substrate and polypropylene film are heated to a temperature between about 25°C. and about 140°C.

* * * * *